US009338669B2

(12) United States Patent
Hamilton et al.

(10) Patent No.: US 9,338,669 B2
(45) Date of Patent: May 10, 2016

(54) METHOD AND APPARATUS FOR ADJUSTING LAYER 3 FILTER COEFFICIENTS

(71) Applicant: Broadcom Corporation, Irvine, CA (US)

(72) Inventors: Christian Hamilton, Basingstoke (GB); Kelvin Ayres, Reading (GB)

(73) Assignee: BROADCOM CORPORATION, Irvine, CA (US)

( * ) Notice: Subject to any disclaimer, the term of this patent is extended or adjusted under 35 U.S.C. 154(b) by 56 days.

(21) Appl. No.: 14/094,844

(22) Filed: Dec. 3, 2013

(65) Prior Publication Data
US 2014/0155049 A1 Jun. 5, 2014

(30) Foreign Application Priority Data

Dec. 4, 2012 (GB) .................................. 1221824.4

(51) Int. Cl.
*H04B 1/00* (2006.01)
*H04W 24/02* (2009.01)
*H04B 17/382* (2015.01)
*H04W 36/04* (2009.01)
(Continued)

(52) U.S. Cl.
CPC .............. *H04W 24/02* (2013.01); *H04B 17/382* (2015.01); *H04W 24/04* (2013.01); *H04W 24/10* (2013.01); *H04W 36/04* (2013.01)

(58) Field of Classification Search
CPC ..... H04W 24/00; H04W 24/02; H04W 24/10; H04W 28/00; H04W 36/00; H04W 36/0088; H04W 36/04; H04W 36/24; H04W 36/245; H04W 76/02; H04W 76/06; H04W 28/18

USPC .......................................... 455/283, 285, 286
See application file for complete search history.

(56) References Cited

U.S. PATENT DOCUMENTS 4,856,031 A * 8/1989 Goldstein ........... H04L 27/2332
375/229
5,121,415 A * 6/1992 Goodman et al. ............ 375/350
(Continued)

FOREIGN PATENT DOCUMENTS

EP           2413625 A1     2/2012

OTHER PUBLICATIONS

RP-020635; "Unit of layer 3 filtering"; Motorola;TSG-RAN Meeting #24; Biarritz, France; Sep. 2002; (7 pages).

*Primary Examiner* — Jean Gelin
(74) *Attorney, Agent, or Firm* — Oblon, McClelland, Maier & Neustadt, L.L.P

(57) ABSTRACT

A UE configured to adjust a L3 filter coefficient, comprises initializing a first filter coefficient of a first filter and a second filter coefficient of a second filter based on a primary filter coefficient of a primary filter received from an associated wireless network entity; adjusting the primary filter coefficient by one of: setting the primary filter coefficient to the first filter coefficient if a first difference between a measurement result of the primary filter and a first measurement result of the first filter is less than a first coefficient threshold and setting the primary filter coefficient to the second filter coefficient if a second difference between the measurement result of the primary filter and a second measurement result of the second filter is less than a second coefficient threshold; and applying the adjusted primary filter coefficient to measurements of one or more cells in an active cell set.

19 Claims, 4 Drawing Sheets

(51) Int. Cl.
*H04W 24/04* (2009.01)
*H04W 24/10* (2009.01)

(56) References Cited

U.S. PATENT DOCUMENTS

| | | | |
|---|---|---|---|
| 7,505,537 B1* | 3/2009 | Sutardja | H03G 3/3036 |
| | | | 341/139 |
| 8,688,051 B2* | 4/2014 | Nakamori et al. | 455/67.11 |
| 8,705,638 B2* | 4/2014 | Ren | 375/259 |
| 2010/0034096 A1* | 2/2010 | Yin | 370/241 |
| 2010/0112958 A1 | 5/2010 | Krishnamurthy et al. | |
| 2012/0094607 A1* | 4/2012 | Nakamori | H04W 24/10 |
| | | | 455/67.11 |
| 2012/0115463 A1* | 5/2012 | Weng | H04L 1/0026 |
| | | | 455/425 |
| 2012/0214541 A1* | 8/2012 | Narasimha et al. | 455/525 |
| 2013/0023302 A1* | 1/2013 | Sivanesan et al. | 455/525 |
| 2013/0142262 A1* | 6/2013 | Ye | H04N 19/0089 |
| | | | 375/240.16 |
| 2013/0266101 A1* | 10/2013 | Schultz | H03H 17/06 |
| | | | 375/350 |
| 2014/0177468 A1* | 6/2014 | Kazmi et al. | 370/254 |

\* cited by examiner

ND APPARATUS FOR ADJUSTING LAYER 3 FILTER COEFFICIENTS

METHOD AND APPARATUS FOR ADJUSTING LAYER 3 FILTER COEFFICIENTS

CROSS REFERENCE TO RELATED APPLICATION

This application claims the benefit under 35 U.S.C. §119(a) and 37 CFR §1.55 to UK patent application no. 1221824.4, filed on Dec. 4, 2012, the entire content of which is incorporated herein by reference.

TECHNICAL FIELD

An example embodiment of the present invention relates generally to wireless communications, and, more particularly, to adjusting layer 3 (L3) filter coefficients.

BACKGROUND

A filter may be implemented at the physical layer (also termed layer 1) or a network layer (also termed Layer 3) of a logically layered architecture of a wireless communication device. A filter at the layer 3, L3 for short, in general is more flexible for modification and adjustment. Layer 3 is a logical layer and may be responsible for communications with peer network entities, control of network signaling and user data flow. For example, L3 may be responsible for the control of packet forwarding including routing through intermediate routers, whereas the data link layer, part of the layer 2, is responsible for media access control, flow control and error checking.

In telecommunication systems, measured quantities of signal strength are typically filtered using a network defined coefficient value. In a UMTS network, typically the signal quantities of cells (e.g., RSCP and ECNO) are filtered using a running Infinite Impulse Response (IIR) filter with a coefficient defined by the network. The use of a network determined coefficient value may lead to a situation where the filtered quantities are either too slow to react to fast changing signal levels or are unable to filter out the unwanted high frequency components that may cause erroneous event triggering.

Another case is a heterogeneous network (HetNet), where an adjustable L3 filter may be desirable. In a HetNet scenario, a user equipment (UE) may need to make decisions on parameter adjustment autonomously, with limited or minimal control signaling from the associated network. A UE with the capability to just performance related parameter such as L3 filter coefficient may be very beneficial.

Following abbreviations are used in this application.
BS Base Station
CPICH Common Pilot Channel
DPCCH Dedicated Physical Control Channel
E-DCH Enhanced Data Channel
ECNO Received Energy Per Chip/Power density in Band
EUTRAN Enhanced UTRAN
HetNet Heterogeneous Network
HS-DPCCH High Speed-Dedicated Physical Control Channel
IIR Infinite Impulse Response
LTE Long Term Evolution
MAC Medium Access Control
RSCP Received Signal Code Power
UE User Equipment
UMTS Universal Mobile Telecommunications System
UTRAN UMTS Radio Access Network
WCDMA Wideband Code Division Multiple Access

SUMMARY

Various aspects of the invention are set out in the claims.

In a first exemplary embodiment of the invention, there is provided a method for a user equipment (UE) to adjust a layer 3 (L3) filter coefficient, comprises initializing a first filter coefficient of a first filter and a second filter coefficient of a second filter based on a primary filter coefficient of a primary filter, the primary filter coefficient being received from an associated wireless network entity; adjusting the primary filter coefficient by one of: setting the primary filter coefficient to the first filter coefficient if a first difference between a measurement result of the primary filter and a first measurement result of the first filter is less than a first coefficient threshold and setting the primary filter coefficient to the second filter coefficient if a second difference between the measurement result of the primary filter and a second measurement result of the second filter is less than a second coefficient threshold; and applying the adjusted primary filter coefficient to measurements of one or more cells in an active cell set.

In a second exemplary embodiment of the invention, there is provided an apparatus for use in a user equipment (UE) to adjust a layer 3 (L3) filter coefficient, comprises at least one processor; and at least one memory including computer program code; the at least one memory and the computer program code being configured to, with the at least one processor, cause the apparatus at least to: initialize a first filter coefficient of a first filter and a second filter coefficient of a second filter based on a primary filter coefficient of a primary filter, the primary filter coefficient being received from an associated wireless network entity; and adjust the primary filter coefficient by one of: setting the primary filter coefficient to the first filter coefficient if a first difference between a measurement result of the primary filter and a first measurement result of the first filter is less than a first coefficient threshold and setting the primary filter coefficient to the second filter coefficient if a second difference between the measurement result of the primary filter and a second measurement result of the second filter is less than a second coefficient threshold; and apply the adjusted primary filter coefficient to measurements of one or more cells in an active cell set.

In a third exemplary embodiment of the invention, there is provided a non-transitory computer-readable storage medium comprising a set of computer-readable instructions stored thereon, which, when executed by a processing system, cause the processing system to carry out a method comprising the steps of: initializing a first filter coefficient of a first filter and a second filter coefficient of a second filter based on a primary filter coefficient of a primary filter, the primary filter coefficient being received from an associated wireless network entity; adjusting the primary filter coefficient by one of setting the primary filter coefficient to the first filter coefficient if a first difference between a measurement result of the primary filter and a first measurement result of the first filter is less than a first coefficient threshold and setting the primary filter coefficient to the second filter coefficient if a second difference between the measurement result of the primary filter and a second measurement result of the second filter is less than a second coefficient threshold; and applying the adjusted primary filter coefficient to measurements of one or more cells in an active cell set.

In accordance with another example embodiment of the present invention, an apparatus for use in a wireless device comprises means configured to initialize a first filter coefficient of a first filter and a second filter coefficient of a second filter based on a primary filter coefficient of a primary filter, the primary filter coefficient being received from an associated wireless network entity; and means configured to adjust the primary filter coefficient by one of: setting the primary filter coefficient to the first filter coefficient if a first difference between a measurement result of the primary filter and a first measurement result of the first filter is less than a first coefficient threshold and setting the primary filter coefficient to the second filter coefficient if a second difference between the measurement result of the primary filter and a second measurement result of the second filter is less than a second coefficient threshold; and means configured to apply the adjusted primary filter coefficient to measurements of one or more cells in an active cell set.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
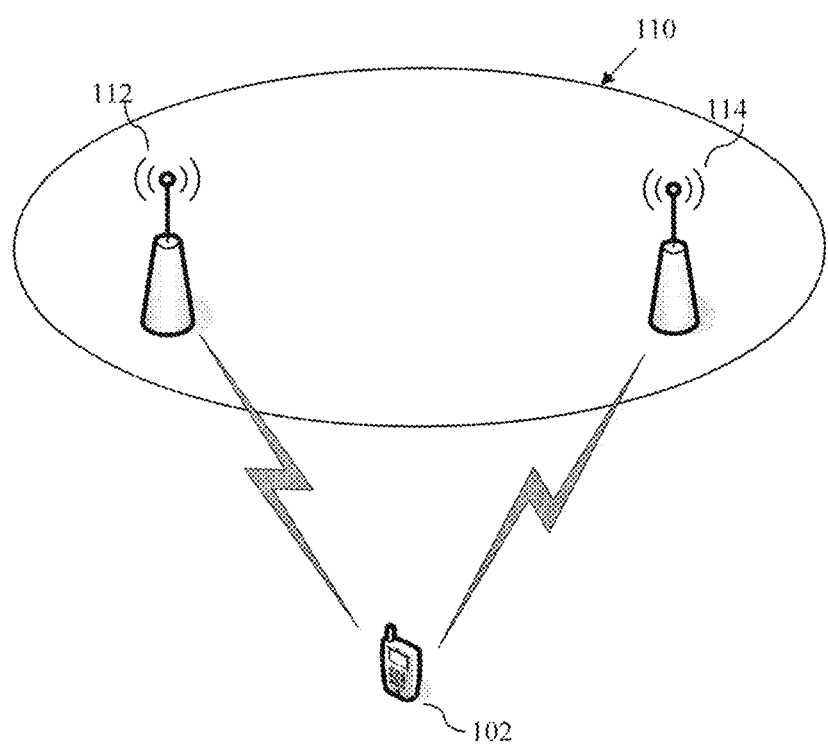
FIG. 1 illustrates an example wireless system in accordance with an example embodiment of the invention.

In an embodiment, wherein initializing the first filter coefficient and the second filter coefficient comprises: deriving the first filter coefficient by subtracting a first coefficient margin from the primary filter coefficient; and deriving the second filter coefficient by adding a second coefficient margin to the primary filter coefficient.

In an embodiment, wherein the first coefficient margin and the second coefficient margin are substantially the same, initially set to 1 and adjustable based on measurement performances and traffic conditions.

In an embodiment, further comprising monitoring the first coefficient difference and the second coefficient difference at one of: a regular interval, a call initiation time, and before adjusting the primary filter coefficient.

In an embodiment, further comprising: reporting to the associated wireless network entity a result of adjusting the primary filter coefficient; and causing an adjustment to the primary filter coefficient by the associated wireless network entity.

In an embodiment, wherein applying the adjusted primary filter coefficient to the measurements of one or more cells in the active cell set comprises applying the adjusted primary filter coefficient to the measurements of a best cell in the active cell set.

In an embodiment, wherein the associated wireless network entity is the best cell in the active cell set and is one of a LTE eNodeB and a WCDMA nodeB, and wherein each of the primary filter, the first filter and the second filter is an L3 filter.

In an embodiment, wherein the associated wireless network entity is a node in a HetNet and the UE is allowed to make an adjustment to the primary filter coefficient.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. As used herein, the terms "data," "content," "information," and similar terms may be used interchangeably to refer to data capable of being transmitted, received and/or stored in accordance with embodiments of the present invention. Likewise, as used herein, the terms "active cell," "active base station," and "active nodeB" may be used interchangeably to refer to a base station of a cellular network to which an UE is connected to via a wireless connection. Thus, use of any such terms should not be taken to limit the spirit and scope of embodiments of the present invention.

Additionally, as used herein, the terms 'circuitry' or 'module' refer to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Referring now to FIG. 1, an example wireless network 100 is provided in accordance with an example embodiment of the invention. The wireless network 100 includes a UE 102, and an active cell set 110 which in turn includes a first cell 112, and a second cell 114. The UE 102 is currently connected to the cell 112 via a wireless connection and can also receive signals from the other cell 114 of the active cell set 110. The cell 112, also termed active cell, as well as the other cell 114 may be a WCDMA network base station nodeB or LTE base station eNodeB.

In one example embodiment, a voice or data call is initiated on the UE 102 while the UE 102 is in the area covered by the active cell set 110. The UE 102 may first set up two layer 3 (L3) filters in addition to the primary L3 filter received from the active cell 112 and initialize two filter coefficients for the two L3 filters. Instead of applying the received primary L3 filter along with its filter coefficient to measurements of the active cell 112, as in a usual measurement operation of a UE, the UE 102 may first attempt to adjust the primary filter coefficient based on the initialized first filter coefficient and the second filter coefficient. As a result of the adjustment, the primary filter coefficient may be adjusted up or down, or remain the same, depending on the traffic conditions, current measured signal qualities, two coefficient thresholds, and the current primary filter coefficient value, among other factors.

Then the UE 102 may apply the adjusted primary filter coefficient and as a result, some spurious measurements may be filtered out and an ill-configured or a not-optimally configured primary filter coefficient may be corrected and fine tuned.

Figure 2:
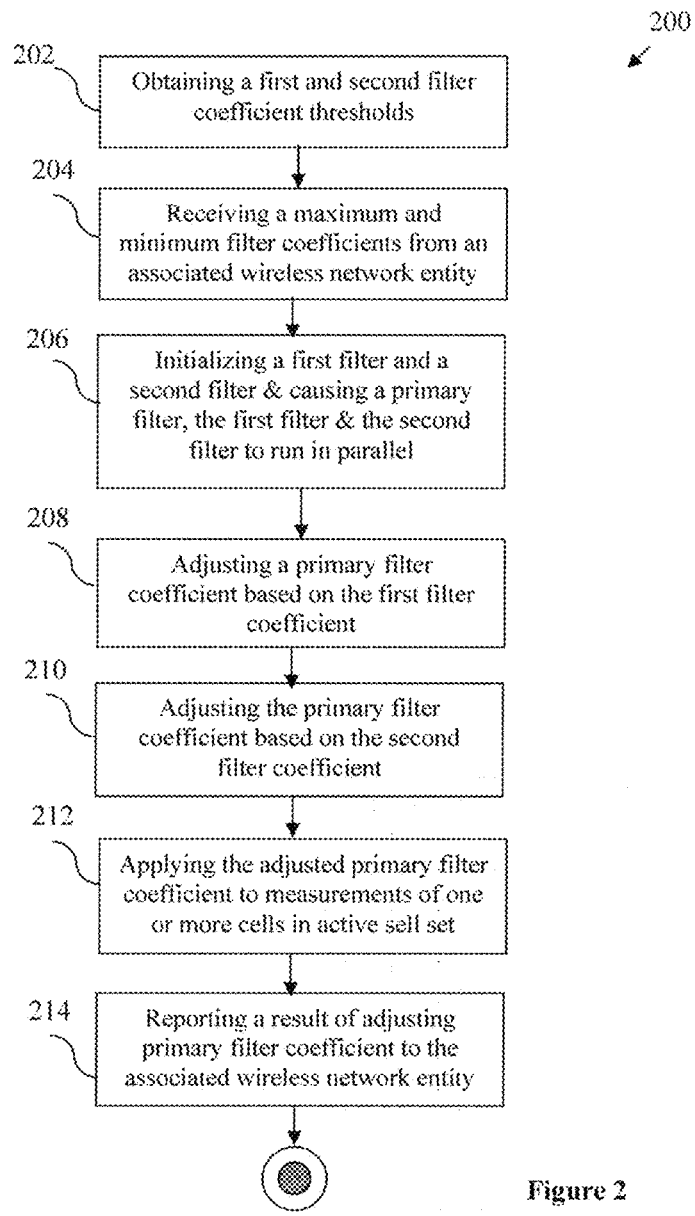
FIG. 2 illustrates an example method for adjusting a L3 filter coefficient in accordance with an example embodiment of the invention.

FIG. 2 illustrates an example method for adjusting or fine tuning a primary filter coefficient in accordance with an example embodiment of the invention. The method 200 may include obtaining a first filter coefficient threshold and a second filter coefficient threshold at step 202, receiving a maximum and a minimum filter coefficients from an associated wireless network entity at step 204, and initializing a first filter coefficient and a second filter coefficient at step 206. The method may also include adjusting the primary filter coefficient based on the first filter coefficient at step 208, adjusting the primary filter coefficient based on the second filter coefficient at step 210, applying the adjusted primary filter coefficient to measurements of one or more cells in an active cell set at step 212 and reporting a result of adjusting the primary filter coefficient to the associated wireless network entity at step 214.

In one example embodiment, obtaining the first and the second filter coefficient thresholds at step 202 may include deriving the first filter coefficient and the second filter coefficient from large amount of empirical data offline before their use. The first filter coefficient threshold and the second coefficient threshold may be a same value in most cases but may also be different. Both the filter coefficient thresholds may represent allowed deviations of the primary filter coefficient in two different directions. If a deviation of the primary filter coefficient is greater than the first coefficient threshold in upward direction, the primary filter coefficient may need to be adjusted upward. If the deviation of the primary filter coefficient is greater than the second coefficient threshold in the downward direction, the primary filter coefficient may need to be adjusted downward. The empirical data for establishing the coefficient thresholds may be related to signal qualities, traffic conditions, applied primary filter coefficients, UE performance data such as call drop numbers and rates, and mobility data, etc. Once the coefficient thresholds are established, the UE 102 may receive them at a system initialization time, a call set up time, a software download time or other appropriate time before they are used.

In one example embodiment, receiving a maximum and a minimum filter coefficient from the associated wireless network entity at step 204 may include receiving a network specified minimum filter coefficient and a maximum filter coefficient from the associated network entity such as the active cell 112. They are normally specified based on a standard such as a 3GPP standard and are applicable network wide. The maximum and minimum filter coefficients are normally set in such a way that they provide sufficient margins to allow most filter coefficients to work while safe guarding the overall system-wide performance. The UE 102 may receive the maximum and minimum filter coefficient at one of a software download time, a UE initialization time and a scheduled system upgrade time.

In one example embodiment, initializing a first filter and a second filter at step 206 may include initializing a first filter coefficient for the first filter and a second filter coefficient for the second filter. Initializing the first filter coefficient may include deriving the first filter coefficient by subtracting a first coefficient margin from the primary filter coefficient. Initializing the second filter coefficient may include deriving the second filter coefficient by adding a second coefficient margin to the primary filter coefficient. The first and second coefficient margins may be initially set to 1 and may be adjustable based on measured signal qualities, measurement performances, traffic conditions and other relevant factors such as mobility. In majority of cases, the coefficient margins may be an integer number and may stay the same. In many cases, the coefficient margins may represent expected deviations of the primary filter coefficient in upward and downward directions respectively.

In one example embodiment, causing the primary filter, the first filter and second filter to run in parallel at step 206 may include starting the three filters together, feeding a data signal into the three filters simultaneously and collecting the results from the three filters in a similar manner.

In one example embodiment, adjusting the primary filter coefficient based on the first filter coefficient at step 208 may include setting the primary filter coefficient to the first filter coefficient if a first difference between a measurement result of the primary filter and a first measurement result of the first filter is greater than a first coefficient threshold. The first difference may represent a deviation of the measurement result caused by the primary filter; and the first coefficient threshold may represent a degree of tolerance of the deviation from the expected value in an upward direction. If the deviation in measurement results caused by the primary filter exceeds the expected value, the primary filter may be adjusted downward. Adjusting the primary filter coefficient based on the first filter coefficient at step 208 may also include reconfiguring the primary filter and the first filter with the new or adjusted primary filter coefficient plus the coefficient margin. Because the first filter coefficient is initialized to a value lower than the primary filter coefficient, adjusting primary filter coefficient at step 208 has an effect of adjusting the primary filter coefficient downward.

In one example embodiment, adjusting the primary filter coefficient based on the second filter coefficient at step 210 may include setting the primary filter coefficient to the second filter coefficient if a second difference between a measurement result of the primary filter and a second measurement result of the second filter is less than a second coefficient threshold. The second difference may represent a deviation of the measurement result caused by the primary filter in a downward direction and the second coefficient threshold may represent a degree of tolerance of the deviation from an expected value. If the deviation in measurement result caused by the primary filter does not exceed the expected value in a downward direction, the primary filter may be adjusted in the upward direction. Adjusting the primary filter coefficient based on the second filter coefficient at step 210 may also include reconfiguring the primary filter and the second filter with the new or adjusted primary filter coefficient plus the coefficient margin. Because the second filter coefficient is initialized to a value higher than the primary filter coefficient, adjusting primary filter coefficient at step 210 has an effect of adjusting the primary filter coefficient upward. In a normal case, only one of adjusting the primary filter coefficient based on the first filter coefficient at step 208 and adjusting the primary filter coefficient based on the second filter coefficient at step 210 may take place at one time. In other words, the primary filter coefficient may be adjusted either downward or upward, but not in both directions at the same time.

In one example embodiment, applying the adjusted primary filter coefficient to measurements of one or more cells of an active cell set at step 212 may include applying the adjusted primary filter coefficient to measurements of signals of all cells or a subset of the active cell set. In one example embodiment, applying the adjusted primary filter coefficient at step 212 may include applying the adjusted primary filter coefficient to the measurements of a best cell of the actively cell set only. One consideration here is to achieve desired results of adjusting the primary filter coefficient without using too much of UE 102's processing power. Applying the adjusted primary filter coefficient at step 212 may include stopping applying the adjusted primary filter coefficient if the adjusted primary filter coefficient is less than a minimum filter coefficient or greater than a maximum filter coefficient. As described at step 204 above, the maximum and minimum filter coefficients are normally set in such a way that they provide sufficient margins to allow most filter coefficients to work while safe guarding the overall system-wide performance and resources.

In one example embodiment, reporting a result of adjusting the primary filter coefficient to the associated wireless network entity at step 214 may include reporting to the associated wireless network entity the result of adjusting the primary filter coefficient by setting the primary filter coefficient to the first filter coefficient or the result of adjusting the primary filter coefficient by setting the primary filter coefficient to the second filter coefficient. In one example embodiment, reporting the result of adjusting the primary filter coefficient to the associated wireless network entity at step 214 may also include causing an adjustment to the primary filter coefficient by the associated wireless network entity. Reporting the result at step 214 may have an effect of providing feedbacks to the associated wireless network entity such as a base station. The wireless network entity may choose not to do anything or to make some adjustment to the primary filter coefficient according to the received feedbacks.

Figure 4:
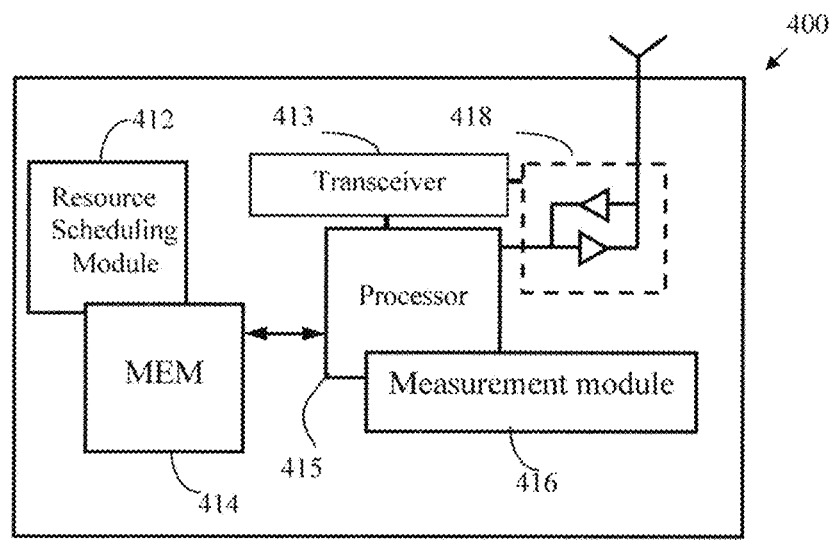
FIG. 4 illustrates an example wireless apparatus in accordance with an example embodiment of the invention.

In one example embodiment, the method 200 may be implemented at the UE 102 of FIG. 1 or at the apparatus 400 of FIG. 4. The method 200 is for illustration only and the steps of the method 200 may be combined, divided, or executed in a different order than illustrated, without departing from the scope of the invention of this example embodiment.

Figure 3:
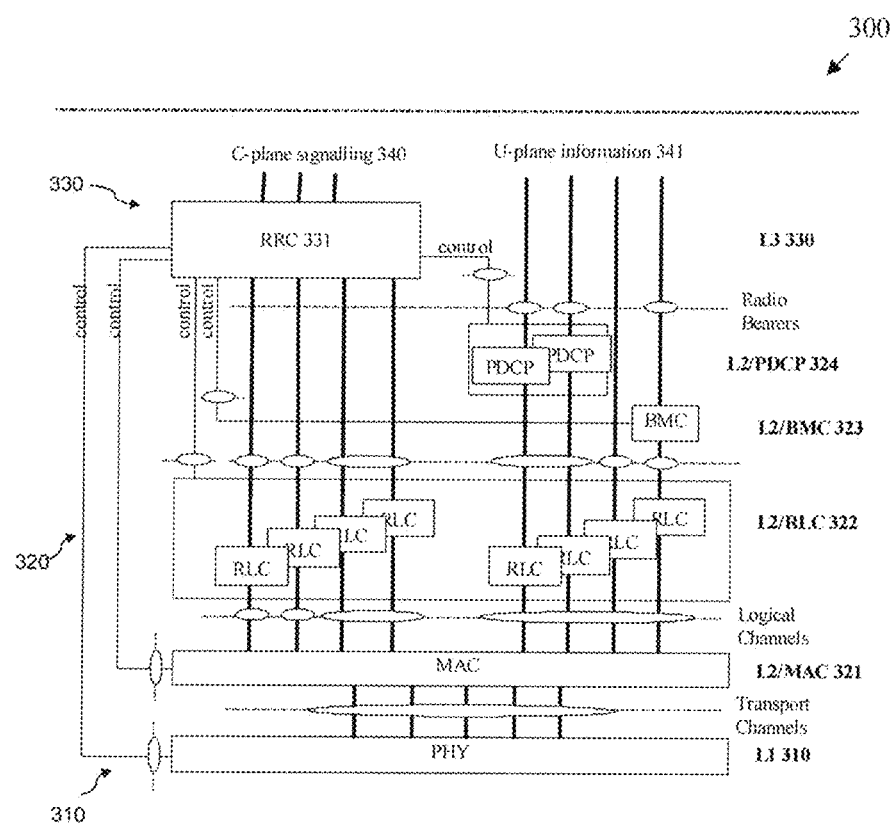
FIG. 3 illustrates an example schematic view of a layered architecture in accordance with an example embodiment of the invention.

FIG. 3 illustrates an example schematic view of a layered radio interface protocol architecture applicable for a UE such as UE 102 of FIG. 1 for an example UMTS or E-UTRAN system. In an overview and in general terms, there are a physical layer L1 310, a data link layer L2 320 and a network layer L3 330. The physical layer L1 310 offers information transfer services to MAC and higher layers and defines the relationship between an UE and the wireless transmission medium. The data link layer L2 320 is split into following sublayers: Medium Access Control (MAC) 321, Radio Link Control (RLC) 322, Packet Data Convergence Protocol (PDCP) 323 and Broadcast/Multicast Control (BMC) 324. The network layer L3 and the RLC 322 are divided into a Control (C-) plane 340, which in essence deals with control signals and a User (U-) plane 341 which in essence deals with user-generated data traffic. In the C-plane 340, the network layer L3 330 is partitioned into sublayers where the lowest sublayer, denoted as Radio Resource Control (RRC) 331, interfaces with the data link layer L2 320 and ultimately terminates in the radio access network. In one example embodiment, the primary filter, two additional L3 filters along with their corresponding filter coefficients and the method 200 for the primary filter coefficient adjustment may be implemented at the control plane 340 in collaboration with the user plane 341.

FIG. 4 illustrates an example wireless apparatus in accordance with an example embodiment of the invention. In FIG. 4, the wireless apparatus 400 may include a processor 415, a memory 414 coupled to the processor 415, and a suitable transceiver 413 (having a transmitter (TX) and a receiver (RX)) coupled to the processor 415, coupled to an antenna unit 418 and a power management module 416. The memory 414 may store programs such as a resource scheduling module 412. The wireless apparatus 400 may be at least part of a generic $4^{th}$ generation handset, or an LTE compatible mobile station.

The processor 415 or some other form of generic central processing unit (CPU) or special-purpose processor such as digital signal processor (DSP), may operate to control the various components of the wireless apparatus 400 in accordance with embedded software or firmware stored in memory 414 or stored in memory contained within the processor 415 itself. In addition to the embedded software or firmware, the processor 415 may execute other applications or application modules stored in the memory 414 or made available via wireless network communications. The application software may comprise a compiled set of machine-readable instructions that configures the processor 415 to provide the desired functionality, or the application software may be high-level software instructions to be processed by an interpreter or compiler to indirectly configure the processor 415.

In an example embodiment, the resource scheduling module 412 may be configured to receive a request with a priority for radio frequency (RF) resource for a traffic load from one of a plurality of radio stacks. The resource scheduling module 412 is also configured to decide the priority for the received request according to one of a user configurable priority scheme, a default priority scheme and a priority scheme. The resource scheduling module 412 is capable of communicating with an active cell or base station via standards protocol such as RRC protocol.

In one example embodiment, the transceiver 413 is for bidirectional wireless communications with another wireless device. The transceiver 413 may provide frequency shifting, converting received RF signals to baseband and converting baseband transmit signals to RF, for example. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. In some embodiments, the transceiver 413, portions of the antenna unit 418, and an analog baseband processing unit may be combined in one or more processing units and/or application specific integrated circuits (ASICs). Parts of the transceiver may be implemented in a field-programmable gate array (FPGA) or reprogrammable software-defined radio.

As shown in FIG. 4, the wireless apparatus 400 may further include a signal management module 416, which may implement L3 filter coefficient adjustment to fine tune measurements. The signal measurement module 416 in collaboration with the resource management module 412 and other modules, may set up two layer 3 (L3) filters in addition to the primary L3 filter received from the active cell 112 and initialize two filter coefficients for the two L3 filters. The measurement module 416 may attempt to adjust the primary filter coefficient based on measurement results using the initialized first filter coefficient and the second filter coefficient. As a result of the adjustment, the primary filter coefficient may be adjusted up or down, or may remain the same, depending on the traffic conditions at the time, two coefficient thresholds that are based on historical data and empirical studies, measurement results based on the two coefficients, and the current primary filter coefficient value received from the active cell 112. Then signal measurement module 416 in collaboration with other modules may apply the adjusted primary filter coefficient and as a result, some spurious measurements may be filtered out and a not-optimally configured primary filter coefficient may be corrected and fine tuned.

In an example embodiment, the antenna unit 418 may be provided to convert between wireless signals and electrical signals, enabling the wireless apparatus 400 to send and receive information from a cellular network or some other available wireless communications network or from a peer wireless device. In an embodiment, the antenna unit 418 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 418 may include antenna tuning and/or impedance matching components, RF power amplifiers, and/or low noise amplifiers.

In general, the various exemplary embodiments of the wireless apparatus 400 may include, but are not limited to, part of a mobile station, an access point or a wireless device such as a portable computer having wireless communication capabilities, Internet appliances permitting wireless Internet access and browsing, as well as portable units or terminals that incorporate combinations of such functions. In one embodiment, the wireless apparatus 400 may be implemented in the network node 102 of FIG. 1.

Without in any way limiting the scope, interpretation, or application of the claims appearing below, a technical effect of one or more of the example embodiments disclosed herein is a removal of spurious measurements reports which may trigger excessive handovers due to an ill-configured system-wide L3 filter coefficient. Another technical effect of one or more of the example embodiments disclosed herein is for an UE to detect a rapid degradation of signal quality and to adopt a filter with a lower coefficient value that in turn may result in a quicker filter response and faster indication of network condition to the associated wireless network entity.

Embodiments of the present invention may be implemented in software, hardware, application logic or a combination of software, hardware and application logic. The software, application logic and/or hardware may reside on a mobile station, an access point, a user equipment or similar network device. If desired, part of the software, application logic and/or hardware may reside on access point, and part of the software, application logic and/or hardware may reside on a network element such as a base station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a mobile device, with one example of a mobile device described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method for a user equipment (UE) to adjust a layer 3 (L3) filter coefficient, the method comprising:
    initializing a first filter coefficient of a first filter and a second filter coefficient of a second filter based on a primary filter coefficient of a primary filter, the primary filter coefficient being received from an associated wireless network entity, the first filter coefficient being initialized as the primary filter coefficient minus a filter coefficient margin, the second filter coefficient being initialized as the primary filter coefficient plus the filter coefficient margin;
    performing a measurement with the primary filter;
    performing a measurement with the first filter;
    performing a measurement with the second filter;
    adjusting the primary filter coefficient by one of:
        setting the primary filter coefficient to the first filter coefficient if a first difference between a measurement result of the primary filter and a first measurement result of the first filter is less than a first coefficient threshold; and
        setting the primary filter coefficient to the second filter coefficient if a second difference between the measurement result of the primary filter and a second measurement result of the second filter is less than a second coefficient threshold; and
    filtering measurements of one or more cells in an active cell set maintained by the user equipment using the adjusted primary filter coefficients to generate filtered measurements.

2. The method of claim 1, further comprising causing the primary filter, the first filter and the second filter to run in parallel.

3. The method of claim 1, further comprising stopping applying the adjusted primary filter coefficient in the event that the adjusted primary filter coefficient is less than a minimum filter coefficient or greater than a maximum filter coefficient.

4. The method of claim 3, further comprising receiving the minimum filter coefficient and the maximum filter coefficient from the associated wireless network entity at one of a software download time, a UE initialization time and a scheduled system upgrade time.

5. The method of claim 1, wherein the first coefficient threshold and the second coefficient threshold are based on historical data and test results, the method further comprising obtaining the first coefficient threshold and the second coefficient threshold prior to the adjusting of the primary filter coefficient by setting the primary filter coefficient to the first filter coefficient and prior to the adjusting of the primary filter coefficient by setting the primary filter coefficient to the second filter coefficient.

6. The method of claim 1, wherein adjusting the primary filter coefficient by setting the primary filter coefficient to:
    the first filter coefficient comprises reconfiguring the primary filter and the first filter with the adjusted primary filter coefficient minus the coefficient margin; or the second filter coefficient comprises reconfiguring the primary filter and the second filter with the adjusted primary filter coefficient plus the coefficient margin.

7. An apparatus for use in a user equipment (UE) to adjust a layer 3 (L3) filter coefficient, the apparatus comprising:
circuitry configured to
initialize a first filter coefficient of a first filter and a second filter coefficient of a second filter based on a primary filter coefficient of a primary filter, the primary filter coefficient being received from an associated wireless network entity, the first filter coefficient being initialized as the primary filter coefficient minus a filter coefficient margin, the second filter coefficient being initialized as the primary filter coefficient plus the filter coefficient margin;
perform a measurement with the primary filter;
perform a measurement with the first filter;
perform a measurement with the second filter;
adjust the primary filter coefficient by one of:
setting the primary filter coefficient to the first filter coefficient if a first difference between a measurement result of the primary filter and a first measurement result of the first filter is less than a first coefficient threshold; and
setting the primary filter coefficient to the second filter coefficient if a second difference between the measurement result of the primary filter and a second measurement result of the second filter is less than a second coefficient threshold; and
filter measurements of one or more cells in an active cell set using the adjusted primary filter coefficient to generate filtered measurements.

8. The apparatus of claim 7, wherein the circuitry is further configured to cause the primary filter, the first filter and the second filter to run in parallel.

9. The apparatus of claim 7, wherein the circuitry is further configured to stop applying the adjusted primary filter coefficient if the adjusted primary filter coefficient is less than a minimum filter coefficient or greater than a maximum filter coefficient.

10. The apparatus of claim 9, wherein the circuitry is further configured to receive the minimum filter coefficient and the maximum filter coefficient from the associated wireless network entity at one of a software download time, a UE initialization time and a scheduled system upgrade time.

11. The apparatus of claim 7, wherein the first coefficient threshold and the second coefficient threshold are based on historical data and test results, and the circuitry is further configured to obtain the first coefficient threshold and the second coefficient threshold prior to the adjusting of the primary filter coefficient by setting the primary filter coefficient to the first filter coefficient and prior to the adjusting of the primary filter coefficient by setting the primary filter coefficient to the second filter coefficient.

12. The apparatus of claim 7, wherein the first coefficient margin and the second coefficient margin are same, initially set to 1 and adjustable based on measurement performances and traffic conditions.

13. The apparatus of claim 7, wherein the circuitry is further configured to monitor the first coefficient difference and the second coefficient difference at one of: a regular interval, a call initiation time, and before adjusting the primary filter coefficient.

14. The apparatus of claim 7, wherein the circuitry is configured to:
report to the associated wireless network entity a result of adjusting the primary filter coefficient; and
cause an adjustment to the primary filter coefficient by the associated wireless network entity.

15. The apparatus of claim 7, wherein circuitry is further configured to reconfigure the primary filter and the first filter with the adjusted primary filter coefficient minus the coefficient margin after adjusting the primary filter coefficient by setting the primary filter coefficient to the first filter coefficient.

16. The apparatus of claim 7, wherein the circuitry is further configured to reconfigure the primary filter and the second filter with the adjusted primary filter coefficient plus the coefficient margin after adjusting the primary filter coefficient by setting the primary filter coefficient to the second filter coefficient.

17. The apparatus of claim 7, wherein the circuitry is further configured to apply the adjusted primary filter coefficient to the measurements of one or more cells in the active cell set by applying the adjusted primary filter coefficient to the measurements of a best cell in the active cell set.

18. The apparatus of claim 17, wherein the associated wireless network entity is the best cell in the active cell set and is one of a LTE eNodeB and a WCDMA nodeB, and wherein each of the primary filter, the first filter and the second filter is an L3 filter.

19. A non-transitory computer-readable storage medium comprising a set of computer-readable instructions stored thereon, which, when executed by a processing system, cause the processing system to perform a method comprising:
initializing a first filter coefficient of a first filter and a second filter coefficient of a second filter based on a primary filter coefficient of a primary filter, the primary filter coefficient being received from an associated wireless network entity, the first filter coefficient being initialized as the primary filter coefficient minus a filter coefficient margin, the second filter coefficient being initialized as the primary filter coefficient plus the filter coefficient margin;
performing a measurement with the primary filter;
performing a measurement with the first filter;
performing a measurement with the second filter;
adjusting the primary filter coefficient by one of:
setting the primary filter coefficient to the first filter coefficient if a first difference between a measurement result of the primary filter and a first measurement result of the first filter is less than a first coefficient threshold; and
adjusting the primary filter coefficient by setting the primary filter coefficient to the second filter coefficient if a second difference between the measurement result of the primary filter and a second measurement result of the second filter is less than a second coefficient threshold; and
filtering measurements of one or more cells in an active cell set using the adjusted primary filter coefficient to generate filtered measurements.

* * * * *